US012783442B2

(12) United States Patent
Ji et al.

(10) Patent No.: US 12,783,442 B2
(45) Date of Patent: Nov. 3, 2026

(54) EFFICIENT ROUTING PROCEDURE FOR ACCELERATING DISTRIBUTED MACHINE LEARNING MODELS IN OPTICAL CIRCUIT SWITCHING BASED CLOUD

(71) Applicant: NEC Laboratories America, Inc., Princeton, NJ (US)

(72) Inventors: Philip Ji, Cranbury, NJ (US); Ting Wang, West Windsor, NJ (US); Zilong Ye, LaVerne, CA (US)

(73) Assignee: NEC Corporation (JP)

( * ) Notice: Subject to any disclaimer, the term of this patent is extended or adjusted under 35 U.S.C. 154(b) by 20 days.

(21) Appl. No.: 19/098,948

(22) Filed: Apr. 2, 2025

(65) Prior Publication Data

US 2026/0044467 A1 Feb. 12, 2026

Related U.S. Application Data

(60) Provisional application No. 63/668,856, filed on Jul. 9, 2024, provisional application No. 63/573,004, filed on Apr. 2, 2024.

(51) Int. Cl.
*G06F 13/40* (2006.01)
*H04B 10/80* (2013.01)

(52) U.S. Cl.
CPC .......... *G06F 13/4022* (2013.01); *G06F 13/40* (2013.01); *H04B 10/801* (2013.01)

(58) Field of Classification Search
None
See application file for complete search history.

(56) References Cited

U.S. PATENT DOCUMENTS

| | | | | |
|---|---|---|---|---|
| 2008/0222340 | A1* | 9/2008 | Danilak | G06F 13/4027 710/307 |
| 2021/0311273 | A1* | 10/2021 | Kalavrouziotis | G02B 6/4206 |
| 2021/0382838 | A1* | 12/2021 | Mittal | G06F 13/4022 |
| 2025/0028559 | A1* | 1/2025 | Ardalan | G06F 13/4022 |

* cited by examiner

*Primary Examiner* — Michael Sun
(74) *Attorney, Agent, or Firm* — Vincent Duffy

(57) ABSTRACT

Disclosed are techniques that provide efficient routing strategies for AllReduce transfers, which are the the dominant traffic in machine learning-centric datacenters, resulting in faster parameter synchronization in distributed machine learning and improving the average training time by over 9%. As compared with the prior art, our efficient route of AllReduce traffic advantageously maximizes bandwidth allocation while minimizing bandwidth tax, accelerates training speed of distributed machine learning models or large language models in optical circuit switching-based clouds, and more efficiently provisions indirect optical paths, by leveraging the unused ports or bandwidth resources from GPU servers that run single or standalone computing jobs.

5 Claims, 9 Drawing Sheets

EFFICIENT ROUTING PROCEDURE FOR ACCELERATING DISTRIBUTED MACHINE LEARNING MODELS IN OPTICAL CIRCUIT SWITCHING BASED CLOUD

CROSS REFERENCE TO RELATED APPLICATIONS

This application claims the benefit of U.S. Provisional Patent Application Ser. No. 63/573,004 filed Apr. 2, 2024, and U.S. Provisional Patent Application Ser. No. 63/668,856 filed Jul. 9, 2024, the entire contents of each of which is incorporated by reference as if set forth at length herein.

FIELD OF THE INVENTION

This application relates generally to distributed machine learning (DML) and the training of models using Graphics Processing Units. More particularly, it pertains to an efficient routing procedure for accelerating distributed machine learning models in optical circuit switching based cloud environments.

BACKGROUND OF THE INVENTION

Distributed Machine Learning (DML) techniques have been advancing at an ever-accelerating pace, especially those involving large language models (LLM). As an LLM become larger, the size of training data becomes larger as well, oftentimes massive, or even hyper-scale in size. Consequently, it is not practical any longer to use only a single GPU for training contemporary large LLMs, as such training could take years to converge.

Nowadays, however, most LLMs are deployed across hundreds of GPUs, and the training process is performed in a distributed and parallel manner. Recent research shows that the training speed of DML is dramatically slowed by the low network bandwidth of traditional cloud services, as network overhead accounts for up to 60% of training iteration time in production environments. Since the data transfers occur between GPUs in the DML training process is huge and stable, optical circuit switching is promising technique to address the network bottleneck by providing stable and high bandwidth connections between GPUs, without requiring frequent reconfiguration.

As the training of DMLs/LLMs are performed across distributed GPUs, parameters of the neural networks must be synchronized in each iteration. Currently, there are two parameter synchronization models in widespread use namely, parameter server and AllReduce. When using AllReduce, parameters are partitioned into n parts, and they are aggregated or reduced using n rings with different starting and ending points.

Notwithstanding its widespread use, it remains challenging and critically important to develop efficient routing procedures to accommodate AllReduce transfers in DMLs/LLMs.

SUMMARY OF THE INVENTION

An advance in the art is made according to aspects of the present disclosure directed to an efficient routing procedure that accelerates distributed machine learning models in optical circuit switching based clouds. Our inventive techniques and procedures provide improved routing performance for AllReduce transfers generated by DMLs/LLMs in each iteration, by increasing the bandwidth between GPUs and decreasing bandwidth tax.

In sharp contrast to the prior art, our inventive technique is a collaborative routing procedure, where indirect optical paths of a given computing job are provisioned in such a way that leverages unused bandwidth resources from another computing job, especially single/standalone computing jobs. Given that such indirect optical paths via single/standalone GPU servers have a two-hop communications (which is the optimal number of hops for any indirect optical paths), our inventive procedures dramatically improve bandwidth allocation for AllReduce transfers and the number of communication hops, thereby improving overall operation speed and efficiency over the prior art.

As we shall show and describe and as compared with the prior art, our inventive disclosure describes an efficient route of AllReduce traffic that advantageously maximizes bandwidth allocation while minimizing bandwidth tax, accelerates training speed of distributed machine learning models or large language models in optical circuit switching-based cloud, and more efficiently provisions indirect optical paths, by leveraging the unused ports or bandwidth resources from GPU servers that run single or standalone computing jobs.

DETAILED DESCRIPTION OF THE INVENTION

Figure 1:
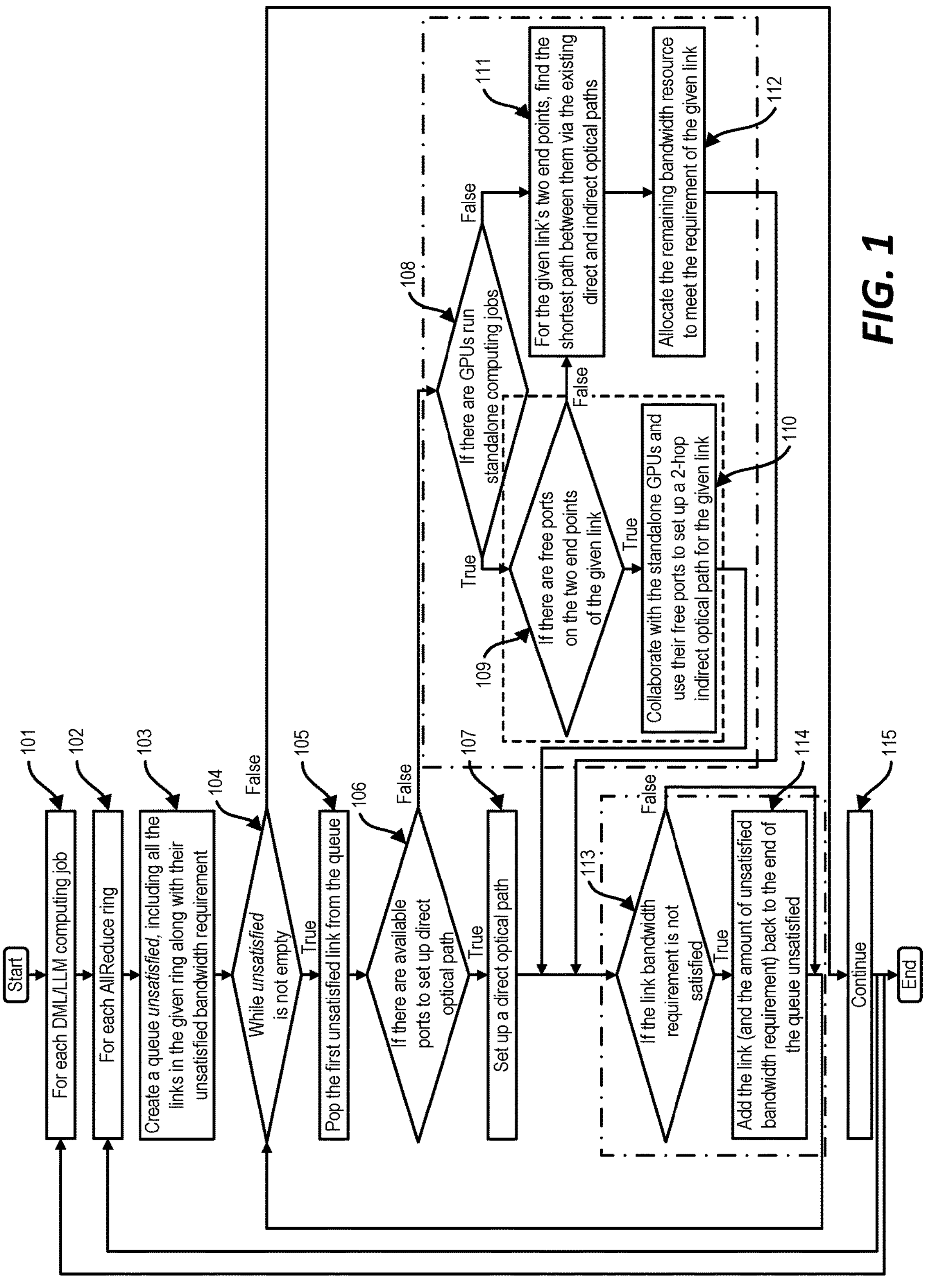
FIG. 1 is a flow diagram showing our inventive main procedure of efficiently routing ALLReduce traffic according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that our invention according to aspects of the present disclosure provides efficient routing for the AllReduce transfers generated by the DMLs/LLMs in each iteration, improving the bandwidth between GPUs and reducing bandwidth tax—as compared to the prior art.

As those skilled in the art will understand and appreciate, for a given DML/LLM computing job, it is necessary to establish a sufficient number of direct optical paths between involved GPUs, so as to achieve a high bandwidth between each of the GPUs. However, as the number of ports on each GPU and each optical circuit switch is very limited (comparing to the number of GPU servers in the cloud), only a limited number of direct optical paths can be established between each GPU pair. Hence, indirect optical paths (or host-based forwarding) are necessary to serve as a complement, where some GPUs are used as relay nodes for an AllReduce transfer for other GPU pairs.

In prior art implementations, indirect paths for a given DML/LLM computing job are provisioned over direct optical paths that are allocated for that computing job. As such, prior art techniques only provide a limited amount of additional bandwidth as the number of direct paths for a given computing job is limited.

By analyzing real-world DML/LLM computing job traces, we discovered that there exist a number of DML/LLM computing jobs that are single or standalone computing jobs. Typically, single or standalone computing jobs are small-size computing jobs that only require one GPU. The optical links between these single/standalone GPU servers and the optical circuit switches have no traffic, so their bandwidth resources are not used.

Consequently, and according to aspects of the present disclosure, we describe a novel and more efficient routing procedure that prioritizes provisioning indirect optical paths via unused bandwidth that are associated with GPU servers that run single or standalone computing jobs. We call this approach a collaborative routing procedure, where indirect optical paths of a given computing job are provisioned such that they "collaborate" to utilize unused bandwidth resources allocated to another computing job, and particularly those single/standalone computing jobs.

Given that these indirect optical paths via single/standalone GPU servers have a two-hop communications path-which is the optimal number of hops for any indirect optical paths-our inventive techniques and procedures advantageously maximize bandwidth allocation for AllReduce transfers while minimizing the number of communication hops.

FIG. 1 is a flow diagram showing our inventive main procedure of efficiently routing ALLReduce traffic according to aspects of the present disclosure. As illustrated in this figure, our inventive routing procedure for AllReduce traffic generated by DML/LLM as shown includes 15 steps, which will be described as follows.

Step 101: This step is the starting point of a for loop. It processes each DML/LLM computing job in the order of their arrivals. More specifically, each DML/LLM computing job is processed using steps 102 through 115.

Step 102: This step is the entering point of an inner for loop. It checks each AllReduce traffic, which is in a ring topology, one by one. More specifically, each AllReduce ring is processed using steps 103 through 115.

Step 103: This step initializes a queue, called unsatisfied, for a given AllReduce ring that is currently being processed. The queue includes of a number of tuples (or pairs), the tuple/pair of which consists of each link of the currently processed ring and the corresponding bandwidth requirement of each link.

Step 104: This is the entering point of a while loop. It checks if the queue unsatisfied is empty or not. If unsatisfied is not empty, it executes steps 105 through 114. If unsatisfied is empty, it will go to step 115 and then continue to process the next AllReduce ring in step 102.

Step 105: This step pops out the first unsatisfied link and its corresponding bandwidth requirement from queue unsatisfied. It provisions an efficient route for this unsatisfied link, with the objective of satisfying its bandwidth requirement.

Step 106: This step checks if there are available ports on the two end GPUs of the given link, and if the two ports can be connected using the same optical circuit switch. If both conditions are met at the same time, it proceeds to step 107 and sets up a direct optical path between the two GPUs using their available ports; otherwise, it proceeds to step 108 to establish indirect optical paths. Here, this step prioritizes the provisioning direct optical path for any given link, so that the bandwidth allocation can be maximized for the given link.

Step 107: This step uses the available ports on the two end GPUs of the given link to set up a direct optical path between them. As the direct optical path performs data transfer in all optical domain, it can offers high bandwidth for the AllReduce traffic.

Step 108: This step checks if there are GPUs that run single or standalone computing jobs. The GPUs that run single or standalone computing jobs do not need to perform parameter synchronization, so there is no AllReduce traffic generated, and thus the optical ports on those GPUs and the corresponding network bandwidth are not used. This step determines how to set up the indirect path. If there are GPUs that run single or standalone computing jobs, it proceeds to step 109 to leverage those GPUs' free ports and bandwidth to set up an efficient 2-hop indirect optical paths; otherwise, it proceeds to step 111 to provision indirect optical paths over existing direct optical paths.

Step 109: This step checks if there are available optical ports on the two end GPUs of a given link. If yes, it will proceed to step 110 to provision an efficient 2-hop indirect path by collaborating with the GPUs that run single or standalone computing jobs; otherwise, it will proceed to step 111 to perform indirect optical paths. Note that, the condition in this step is different than the condition in step 106. The available ports on the two end GPUs in this step are not connected by the same optical circuit switch (because if they are connected by the same optical circuit switch, the procedure will go to step 107 rather than coming to steps 108 and 109).

Step 110: This step routes the AllReduce traffic of the given link by collaborating with those GPUs that run single or standalone computing jobs. It leverages unused optical ports and bandwidth connects on those standalone GPUs to set up an efficient 2-hop indirect optical paths between the two end GPUs of the given link. Here, the standalone GPUs serve as a relay to carry the AllReduce traffic between the two end GPUs of the given link, and hence, the corresponding indirect optical paths are exactly 2 hops. Such an efficient way of provisioning 2-hop indirect paths can effectively reduce the communication latency between the two end GPUs and efficiently reduce the bandwidth tax as the communication hops are 2 hops. This is the reason why step 110 is prioritized over step 111.

Step 111: This step handles how to provision indirect optical paths over the existing direct optical paths. If there are no standalone GPUs or if there are no available ports on the two end GPUs of the given link, then the procedure will execute step 111 to find the shortest path between the two end GPUs of the given link over the graph that is constructed by the existing direct optical path. Such a shortest path may not be in 2 hops, but introduces more hops, so its priority is lower than step 110.

Step 112: This step allocated the remaining bandwidth resource over the shortest path found in step 111 to satisfy the bandwidth requirement of the given link. To this end, an indirect optical path that involve more than 2 hops is established.

Step 113: This step checks if the given link's bandwidth requirement is satisfied or not. If it is not satisfied, it proceeds to step 114; otherwise, it will go back to step 104 and process the next link from queue unsatisfied. This step is critically important, because it is introducing a round-robin-like manner for each link in the AllReduce ring to take turns to utilize the optical ports on the GPU servers, rather than exhausting all the available optical ports to serve just one link.

Step 114: This step will add the link back to the end of queue unsatisfied. If the given's links bandwidth requirement is still not satisfied, it will be added back to the queue and waits for its next turn to be served by another direct or indirect optical path.

Step 115: This step will simply perform the continue to check the next AllReduce ring for a given DML/LLM computing job.

We now shown an application of our inventive optical communication techniques for machine learning-centric datacenters including our efficient AllReduce routing strategy we call collaborative routing strategy, which improves bandwidth allocation for parameter synchronization, thus accelerating training speeds of LLM/DML.

The collaborative routing strategy can better utilize the unused optical communication ports and the corresponding bandwidth resources on GPUs that runs single-GPU jobs for establishing indirect routing paths. As a result, additional bandwidth can be provisioned for parameter synchronization.

We have conducted comprehensive simulations to evaluate the performance of our inventive collaborative routing strategy. Simulation results show that our collaborative routing strategy will provision up to 13% more bandwidth, and achieve an 8% faster average job completion time, as compared with prior art baseline routing strategies employed nowadays.

Collaborative Routing for AllReduce Transfers

Figure 2:
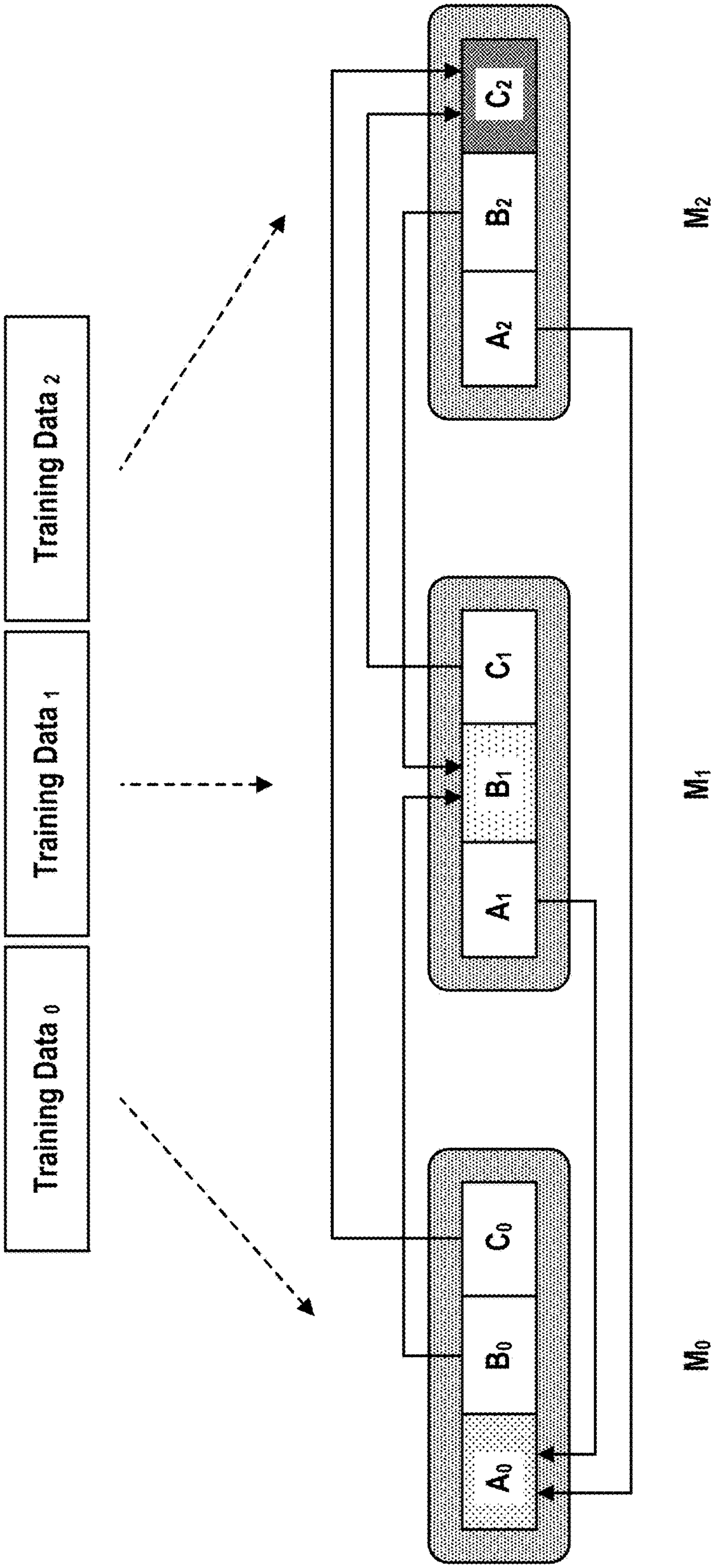
FIG. 2 is a schematic diagram showing illustrative DML and AllReduce in graphical form according to aspects of the present disclosure.

FIG. 2 is a schematic diagram showing illustrative DML and AllReduce in graphical form according to aspects of the present disclosure.

As illustratively shown in that FIG. 2, the given LLM job is trained on three machines using different parts of the training datasets. Since model parameter updates are different after each iteration round, GPUs need to communicate and aggregate their parameter updates before a next iteration. When AllReduce is adopted, the parameter updates are aggregated in a distributed manner on a ring topology, as shown in FIG. 2.

After a training iteration, the parameter updates on each machine are divided into three parts ($A_i$, $B_i$, and $C_i$, where i is the machine id. The parameter aggregation task is distributed among the machines. Mo will collect parameter updates part A from M1 and M2, calculate the updated parameters and then send them back to M1 and M2. Similarly, worker 2 and worker 3 will handle the parameter aggregation part B and part C, respectively.

The AllReduce transfers are large-volume and stable, so optical communication techniques can be used to provide high bandwidth connections to serve them well. In this paper, we apply optical circuit switching techniques for building the GPU clusters.

Figure 3:
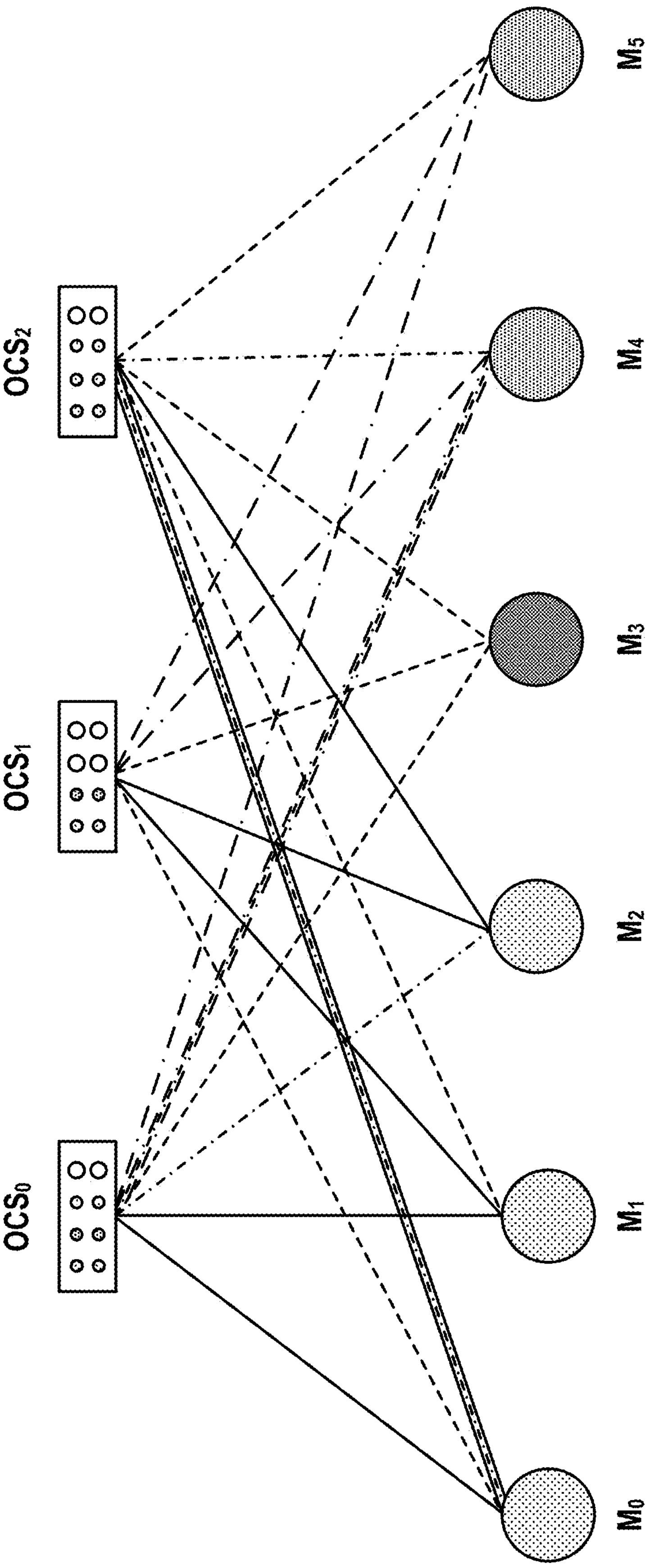
FIG. 3 is a schematic diagram showing illustrative Baseline Routing according to aspects of the present disclosure.

FIG. 3 is a schematic diagram showing illustrative Baseline Routing according to aspects of the present disclosure. In FIG. 3, the GPU machines are equipped with optical ports and connected by optical circuit switches in a fully connected topology. Direct routing paths and indirect routing paths can be established on this optical-supported clusters for accommodating AllReduce transfers. Direct routing path provides a high bandwidth connection between two GPUs in all-optical domain via just one optical circuit switch, e.g., Mo-OCS2-M2 in FIG. 3. Indirect routing paths may use working GPUs as intermediate relays between the source and destination, e.g., Mo-OCS2-M4-OCS0-M2 in FIG. 3.

To achieve a fast parameter synchronization, one should allocate as much bandwidth as possible for the AllReduce transfers. Due to the limited number of optical ports on each GPU and the topology connectivity, only a limited number of direct routing paths can be established. Indirect routing paths serve as a complement to further provision additional bandwidth resources.

Recent research shows that there is still a large portion of GPUs in public clouds that run single-GPU jobs. The optical ports and corresponding bandwidth resources at the GPUs that run single-GPU jobs are underutilized. The collaborative routing strategy prioritizes to use these underutilized resources to maximize additional bandwidth that can be allocated for the indirect routing paths.

Figure 4:
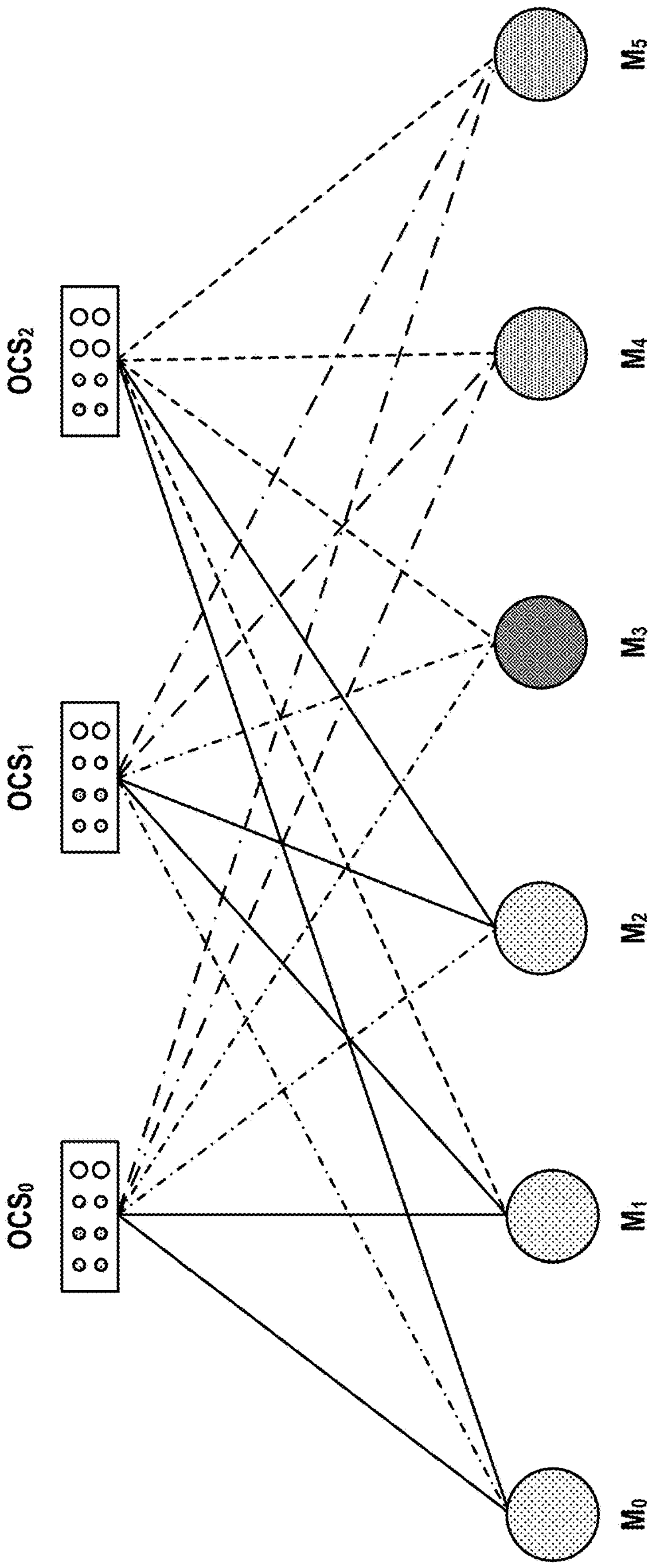
FIG. 4 is a schematic diagram showing illustrative Collaborative Routing according to aspects of the present disclosure.

FIG. 4 is a schematic diagram showing illustrative Collaborative Routing according to aspects of the present disclosure. In FIG. 3 and FIG. 4, a small GPU cluster is serving three machine learning jobs, where two distributed machine learning jobs run on Mo, M1, M2 and M4, M5 respectively, and one single-GPU job runs on M3. In FIG. 2(*a*), existing baseline AllReduce routing may provision an indirect path between Mo and M2 via the path Mo-OCS2-M4-OCSo-M2. This indirect routing path can only use the remaining bandwidth resources from established direct routing paths, which is limited.

As a comparison, the collaborative routing strategy will establish the indirect routing path Mo-OCS1-M3-OCS0-M2, which can leverage the unused bandwidth resources from M3 to gain more bandwidth for the indirect routing paths.

Numerical Results

We performed comprehensive simulations to evaluate the performance of the proposed collaborative routing strategy. In the simulation, by default, the GPU cluster consists of 10 GPUs (each has six 10 Gbps optical transmission port) and 6 optical circuit switches (each has 10 points) connected by a fully connected topology (FIG. 3 and FIG. 4).

By default, the simulator will randomly generate 10 machine learning jobs. Each computing job requires 1 to 3 GPUs, connected in a ring topology. Each machine learning job requires SOK rounds of iterations for convergence, and the average time gap between iterations is less than 100 ms.

The amount of AllReduce transfers in each iteration has a size within [0.08, 8] GB. All the numerical results in the following parts are the average performance results in 1000 simulation rounds.

Figure 5A:
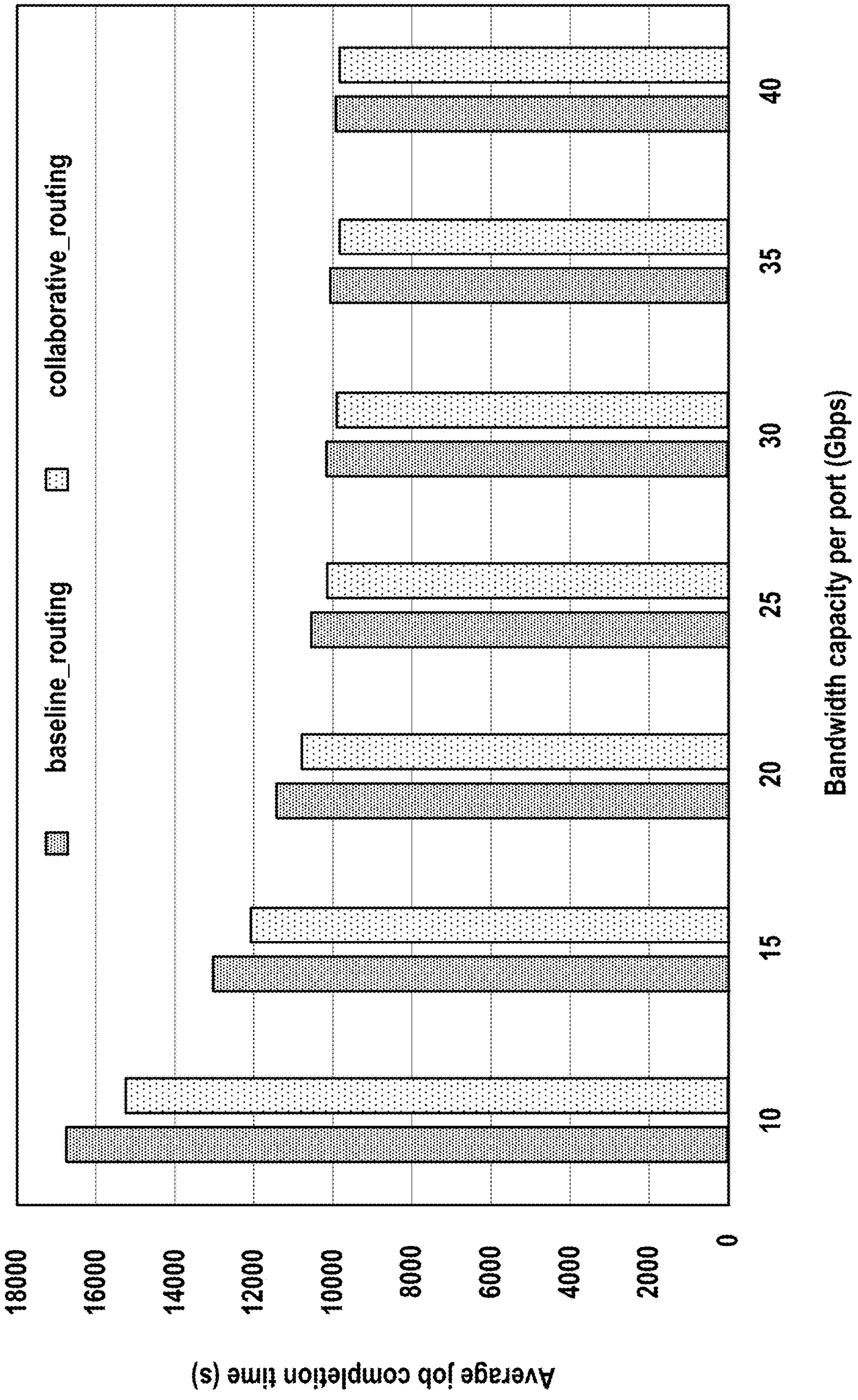
FIG. 5(A), FIG. 5(B), FIG. 5(C), and FIG. 5(D) show a series of plots illustrating simulation results for our inventive techniques according to aspects of the present disclosure.
Figure 5B:
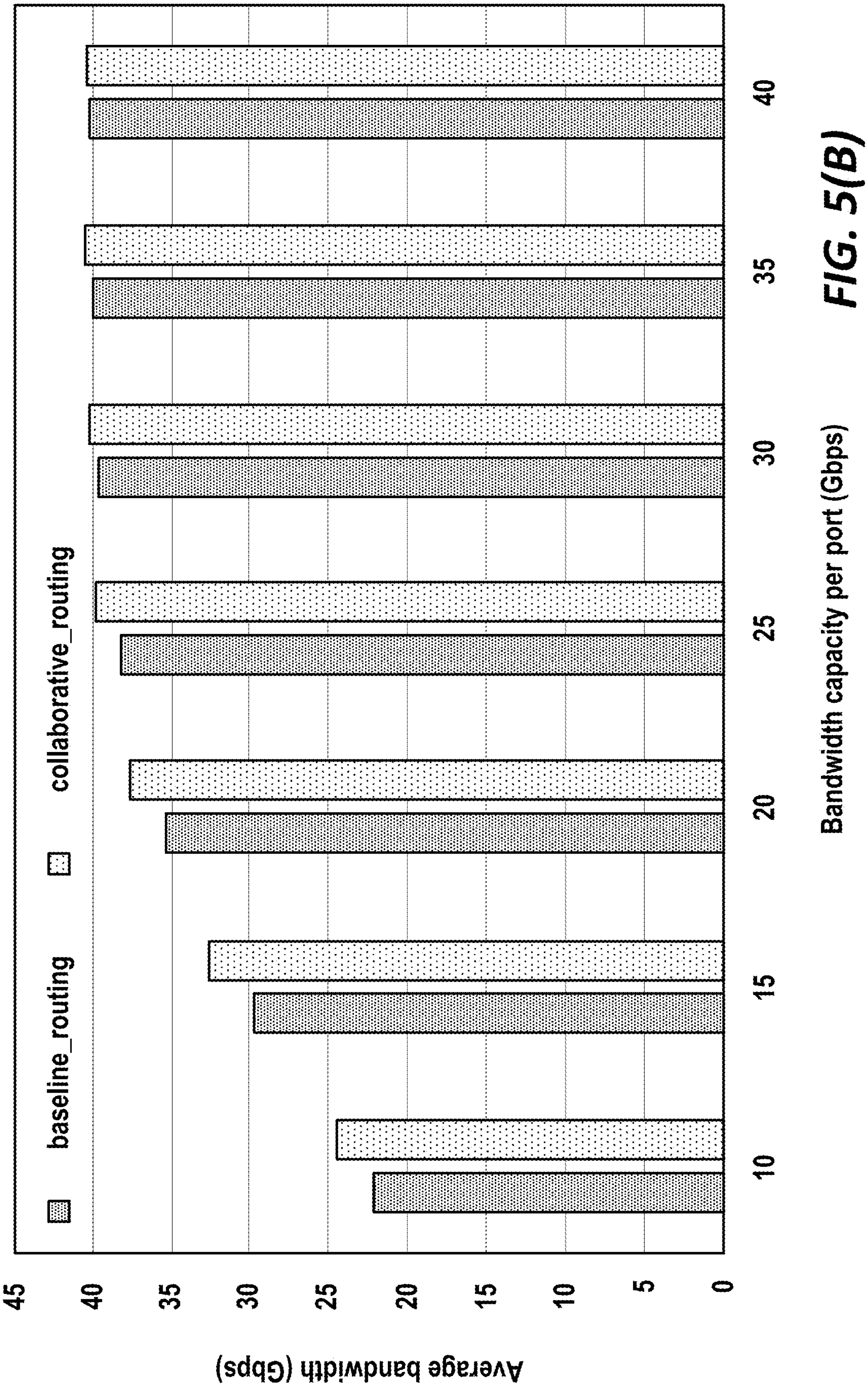

FIG. 5(A), FIG. 5(B), FIG. 5(C), and FIG. 5(D) show a series of plots illustrating simulation results for our inventive techniques according to aspects of the present disclosure. In FIG. 5(A), we can see that the collaborative routing algorithm can achieve smaller average job completion time (by up to 9% smaller) than the basic routing algorithm. The reason behind this is because more bandwidth resources can be provisioned using the collaborative routing, which is shown in FIG. 5(B). Compared to baseline routing, collaborative routing can better utilize the unused ports and bandwidth resources at the GPUs that run single-GPU computing jobs, thus more bandwidth can be allocated to the indirect routing paths.

Figure 5C:
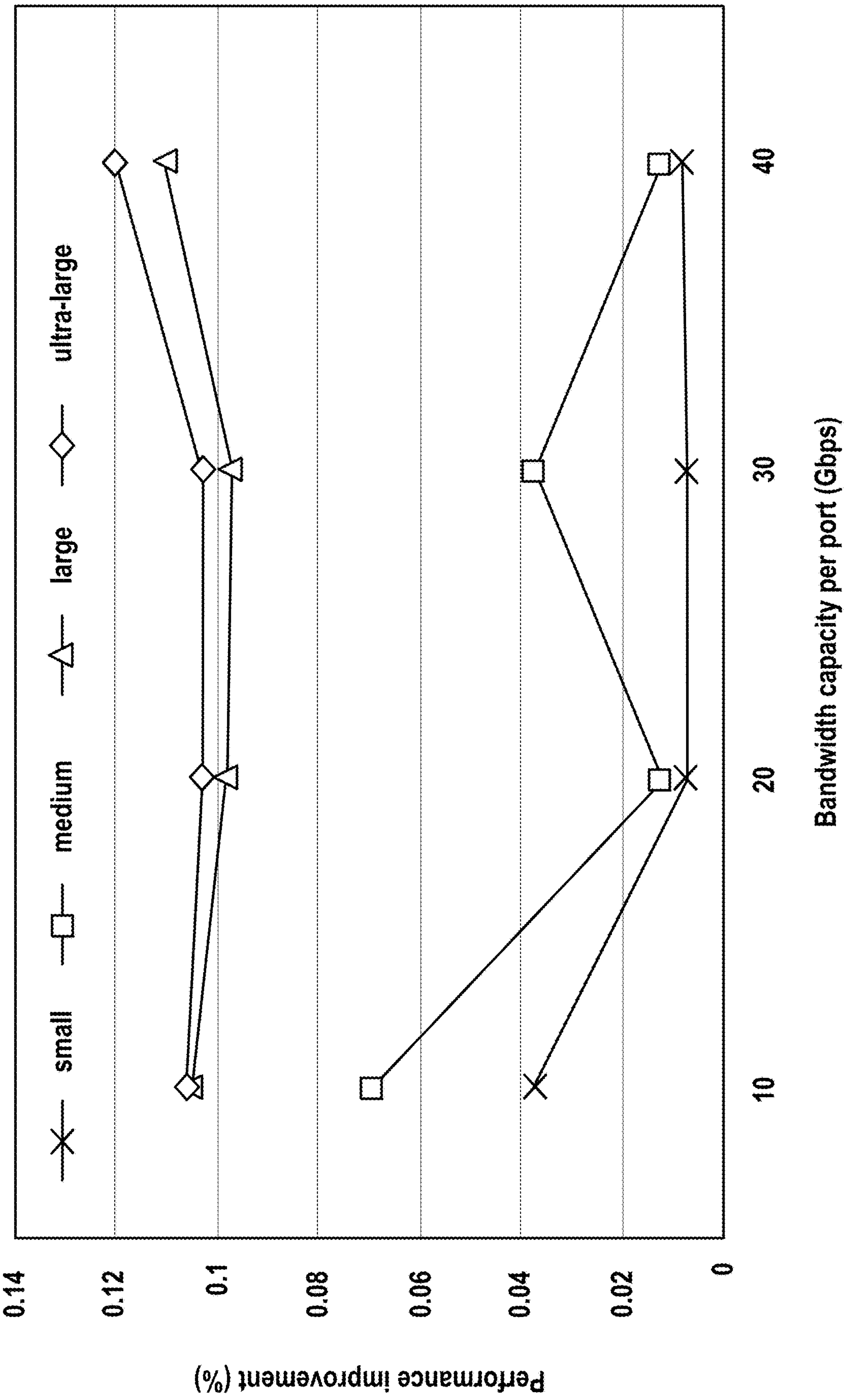

In FIG. 5(C), we take a deeper look at the performance improvement of collaborative routing over baseline routing for different types of jobs. We considered four types of jobs, which are small (e.g., ResNet-50), medium (e.g., AlexNet and VGG), large (e.g., GPT-3 and BERT Large), and ultra large (e.g., GPT-4).

Figure 5D:
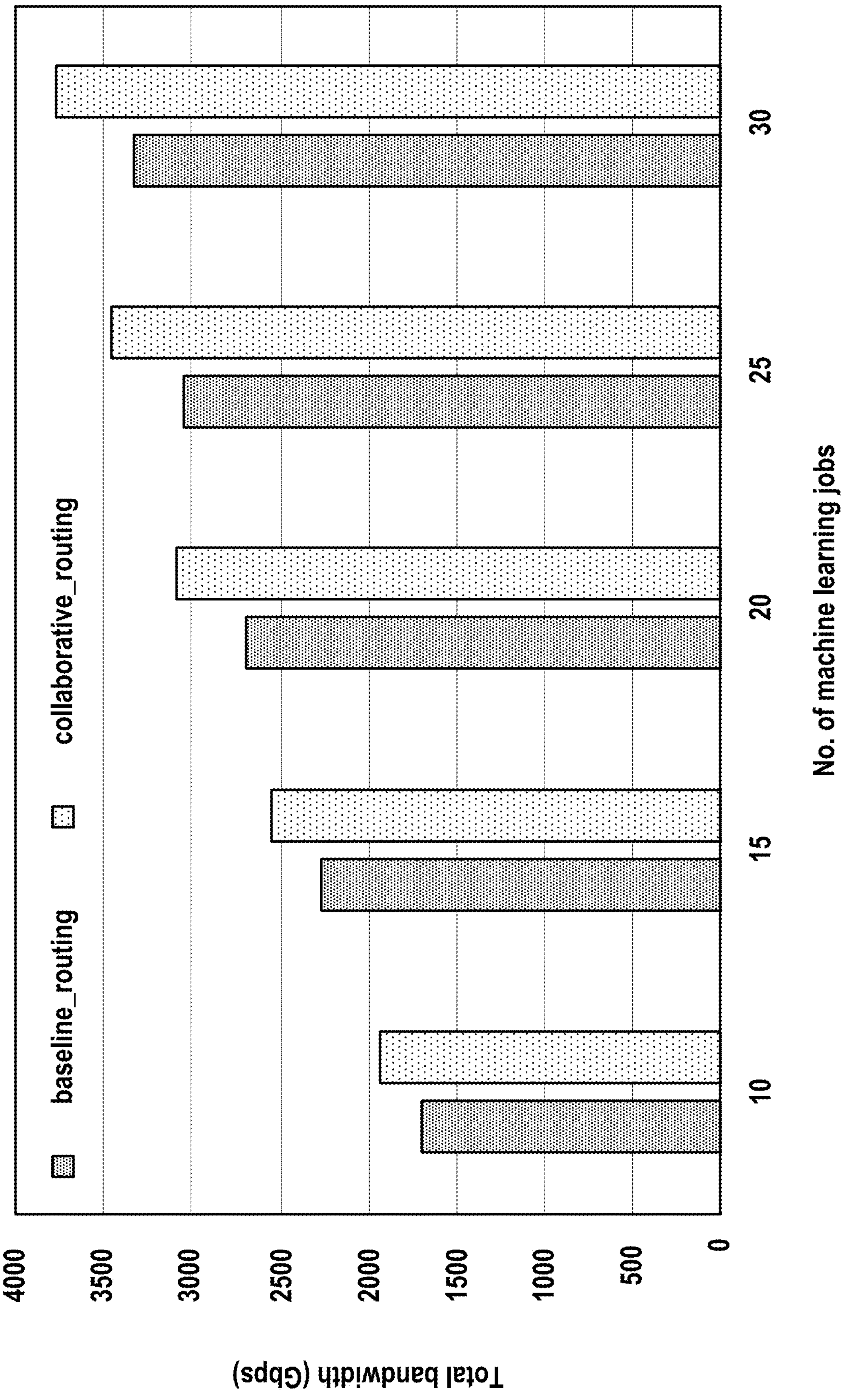
Figure 6:
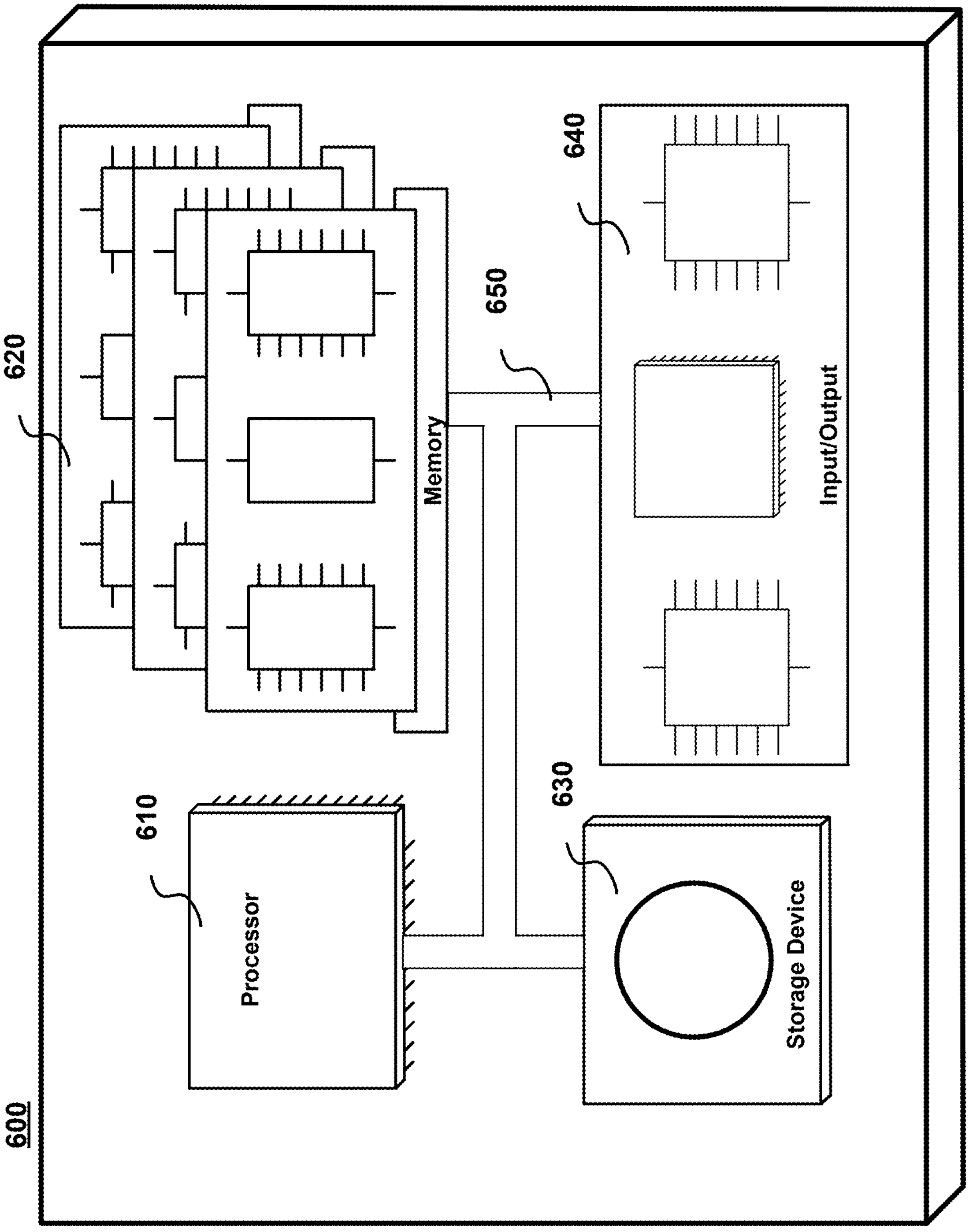
FIG. 6 is a schematic diagram showing an illustrative computer system in which methods of the instant disclosure may be executed.

We can see that collaborative routing outperforms baseline routing for the large and ultra large jobs, where the average performance improvement is above 10%. The performance improvement is not significant for small and medium jobs, because there is only a limited number of indirect routing paths provisioned while most of the bandwidth demand of those small jobs can be well served by direct routing paths. Finally, we scale up the simulation size by using 100 GPUS, each of which is equipped with 40 Gbps optical ports, with large-size jobs. As shown in FIG. 5(D), we can observe that collaborative routing can achieve more bandwidth resources (12% in average) than the baseline algorithm FIG. 6 is a schematic block diagram of an illustrative computing system that may be programmed with instructions that when executed produce the methods/algorithms according to aspects of the present invention.

As may be immediately appreciated, such a computer system may be integrated into another system such as a router and may be implemented via discrete elements or one or more integrated components. The computer system may comprise, for example, a computer running any of a number of operating systems. The above-described methods of the present disclosure may be implemented on the computer system 600 as stored program control instructions.

Computer system 600 includes processor 610, memory 620, storage device 630, and input/output structure 640. One or more input/output devices may include a display 645. One or more busses 650 typically interconnect the components, 610, 620, 630, and 640. Processor 810 may be a single or multi core. Additionally, the system may include accelerators etc., further comprising the system on a chip.

Processor 610 executes instructions in which embodiments of the present disclosure may comprise steps described in one or more of the Drawing figures. Such instructions may be stored in memory 620 or storage device 630. Data and/or information may be received and output using one or more input/output devices.

Memory 620 may store data and may be a computer-readable medium, such as volatile or non-volatile memory. Storage device 630 may provide storage for system 600 including for example, the previously described methods. In various aspects, storage device 630 may be a flash memory device, a disk drive, an optical disk device, or a tape device employing magnetic, optical, or other recording technologies.

Input/output structures 640 may provide input/output operations for system 600.

While we have presented our inventive concepts and description using specific examples, our invention is not so limited. Accordingly, the scope of our invention should be considered in view of the following claims.

The invention claimed is:

1. A computer-implemented method for accelerating distributed machine learning models in optical circuit switching based cloud environments comprising:

establishing, for a first distributed machine learning/large language model (DML/LLM) computing job executing in an optical circuit switching based cloud environment, a direct optical path between each individual one of a plurality of involved Graphics Processing Units (GPUs); and establishing, for the first DML/LLM computing job executing in an optical circuit switching based cloud environment, an indirect optical path between at least a pair of the plurality of GPUs when there are insufficient direct optical paths available;

wherein the indirect optical path between at least a pair of the plurality of GPUs is one selected from a second DML/LLM computing job that is a single or standalone computing job.

2. The method of claim 1 wherein the single or standalone computing job is one that only requires one GPU.

3. The method of claim 2 wherein indirect optical path has two-hop communications.

4. The method of claim 3 wherein the first DML/LLM computing job includes AllReduce transfers.

5. The method of claim 4 wherein the indirect optical path is not pre-provisioned for the first DML/LLM computing job.

* * * * *